US012670158B2

(12) United States Patent　(10) Patent No.:　US 12,670,158 B2
Macksood　(45) Date of Patent:　Jun. 30, 2026

(54) UNDERSTANDING STORAGE UTILIZATION OF A CACHING SYSTEM THROUGH INCOMING TRAFFIC

(71) Applicant: Microsoft Technology Licensing, LLC, Redmond, WA (US)

(72) Inventor: Mohamed Azmil Macksood, Oslo (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 121 days.

(21) Appl. No.: 18/657,767

(22) Filed: May 7, 2024

(65) Prior Publication Data

US 2025/0348486 A1　Nov. 13, 2025

(51) Int. Cl.
　*G06F 16/00*　(2019.01)
　*G06F 16/2453*　(2019.01)
(52) U.S. Cl.
　CPC ............................. *G06F 16/24539* (2019.01)
(58) Field of Classification Search
　CPC ....................... G06F 16/24539; G06F 16/2282
　See application file for complete search history.

(56) References Cited

U.S. PATENT DOCUMENTS 12,126,506 B1 * 10/2024 Ma ......................... H04L 43/067
2010/0274768 A1 10/2010 Wang 2017/0103103 A1 * 4/2017 Nixon ................. G06F 16/2452
2018/0095963 A1 * 4/2018 Verma ................... G06F 16/313
2019/0079965 A1 3/2019 Pareek
2019/0332692 A1 10/2019 Rachapudi
2020/0250172 A1 * 8/2020 Busjaeger ......... G06F 16/24552
2022/0188332 A1 * 6/2022 Weaver .............. G06F 16/2358
2022/0197904 A1 * 6/2022 Gillis ................. G06F 16/2455

FOREIGN PATENT DOCUMENTS

KR　　　101981310 B1　　5/2019
WO　　2021109724 A1　　6/2021

OTHER PUBLICATIONS

Extended European Search Report Received in European Patent Application No. 25173478.6 mailed on Aug. 14, 2025, 07 pages.

* cited by examiner

*Primary Examiner* — Dinku W Gebresenbet
(74) *Attorney, Agent, or Firm* — Foley IP Law, PLLC

(57)　　　　　　　　ABSTRACT

Database management techniques can gauge real-time caching states of no-schema-based (noSQL) databases (DBs) during runtime operation by maintaining a log table to reflect modifications to the noSQL DB. The log table is maintained by adding row entries to reflect modifications to the noSQL DB and therefore does not requiring querying the noSQL DB. The log table may then be deduplicated to remove stale entries and queried to generate a cost table reflecting a real-time caching state of the noSQL DB.

20 Claims, 14 Drawing Sheets

Cost Table

| Property | Values | Size |
|---|---|---|
| Property 1 | {"Value1", "Value3", "Value4"} | 18 Chars |
| Property 2 | {"Value2"} | 6 Chars |
| Property 3 | {"Value5"} | 6 Chars |

Log Table

| Timestamp | Key | Operation | Value |
|---|---|---|---|
| Day 1 | 1 | ADD | {"Property1": "Value0"} |
| Day 2 | 1 | DELETE | |
| Day 3 | 1 | ADD | {"Property1": "Value3"} |

| Key-Value Table | |
|---|---|
| <u>Key</u> | <u>Value</u> |
| 1 | <u>{"Property1": "Value0"}</u>     <u>ADD</u> |
| 2 | |
| 3 | |

511 →

502

| Log Table | | | |
|---|---|---|---|
| <u>DAY</u> | <u>Key</u> | <u>Operation</u> | <u>Value</u> |
| 1 | 1 | ADD | {"Property1": "Value0"} |

Key-Value Table

| Key | Value |
|-----|-------|
| 1 | ~~{"Property1": "Value0"}~~      DELETE |
| 2 | |
| 3 | |

512 →

502

Log Table

| Day | Key | Operation | Value |
|-----|-----|-----------|-------|
| 1 | 1 | ADD | {"Property1": "Value0"} |
| 1 | 1 | DELETE | |

Key-Value Table

| Key | Value |
|-----|-------|
| 1 | |
| 2 | {"Property1": "Value3"}      ADD |
| 3 | |

Log Table

| Day | Key | Operation | Value |
|-----|-----|-----------|-------|
| 1 | 1 | ADD | {"Property1": "Value0"} |
| 1 | 1 | DELETE | |
| 1 | 2 | ADD | {"Property1": "Value3"} |

501

Key-Value Table

| Key | Value | |
|-----|-------|---|
| 1 | | |
| 2 | {"Property1": "Value3"} | |
| 3 | {"Property1", "Value4", "Propery3", "Value5"} | ADD |

514 →

502

Log Table

| Timestamp | Key | Operation | Value |
|-----------|-----|-----------|-------|
| 1 | 1 | ADD | {"Property1": "Value0"} |
| 1 | 1 | DELETE | |
| 1 | 2 | ADD | {"Property1": "Value3"} |
| 2 | 3 | ADD | {"Property1", "Value4", "Propery3", "Value5"} |

Figure 5E:
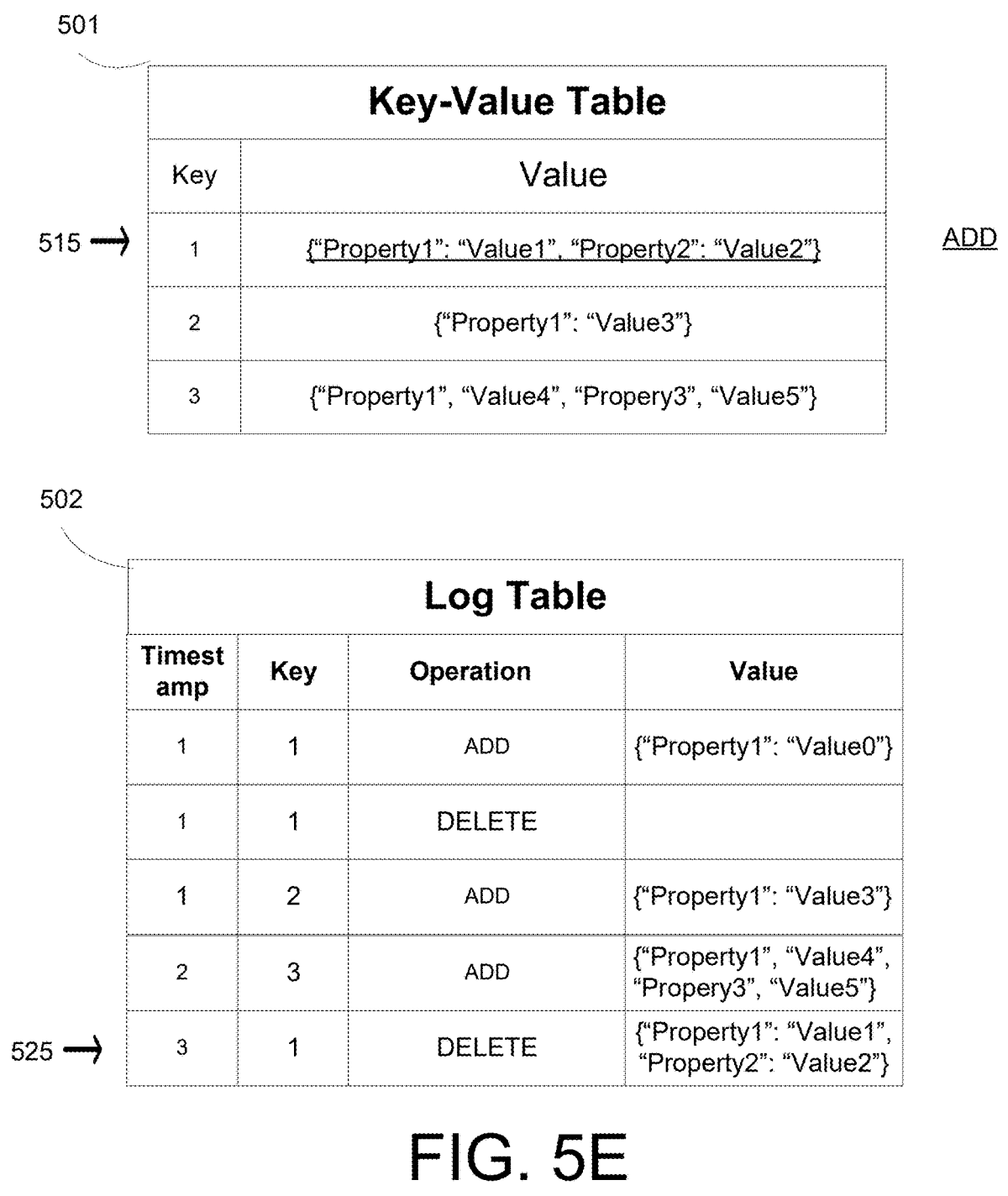

| Key-Value Table | |
|---|---|
| Key | Value |
| 1 | {"Property1": "Value1", "Property2": "Value2"} |
| 2 | {"Property1": "Value3"} |
| 3 | {"Property1", "Value4", "Propery3", "Value5"} |

515 → (row 1)  ADD

502

| Timest amp | Key | Operation | Value |
|---|---|---|---|
| Log Table | | | |
| 1 | 1 | ADD | {"Property1": "Value0"} |
| 1 | 1 | DELETE | |
| 1 | 2 | ADD | {"Property1": "Value3"} |
| 2 | 3 | ADD | {"Property1", "Value4", "Propery3", "Value5"} |
| 3 | 1 | DELETE | {"Property1", "Value1", "Property2": "Value2"} |

525 → (last row)

| Log Table | | | |
|---|---|---|---|
| DAY | Key | Operation | Value |
| 1 | 1 | ADD | {"Property1": "Value0"} |
| 1 | 1 | DELETE | |
| 1 | 2 | ADD | {"Property1": "Value3"} |
| 2 | 3 | ADD | {"Property1", "Value4", "Propery3", "Value5"} |
| 3 | 1 | DELETE | {"Property1": "Value1", "Property2": "Value2"} |

| Log Table | | | |
|---|---|---|---|
| DAY | Key | Operation | Value |
| 1 | 1 | ADD | {"Property1": "Value0"} |
| 1 | 1 | DELETE | |
| 3 | 1 | DELETE | {"Property1": "Value1", "Property2": "Value2"} |
| 1 | 2 | ADD | {"Property1": "Value3"} |
| 2 | 3 | ADD | {"Property1", "Value4", "Propery3", "Value5"} |

| Log Table | | | |
|---|---|---|---|
| DAY | Key | Operation | Value |
| 3 | 1 | DELETE | {"Property1": "Value1", "Property2": "Value2"} |
| 1 | 2 | ADD | {"Property1": "Value3"} |
| 2 | 3 | ADD | {"Property1", "Value4", "Propery3", "Value5"} |

615 — (row 1)
613 — (row 2)
614 — (row 3)

FIG 6C

Cost Table

705

| Property | Values | Size Expense |
|---|---|---|
| Property 1 | {"Value0": "Value3", "Value4"} | 18 Chars |
| Property 2 | {"Value2"} | 6 Chars |
| Property 3 | {"Value5"} | 6 Chars |

730 — Property 1

740 — Property 2

750 — Property 3

FIG. 7

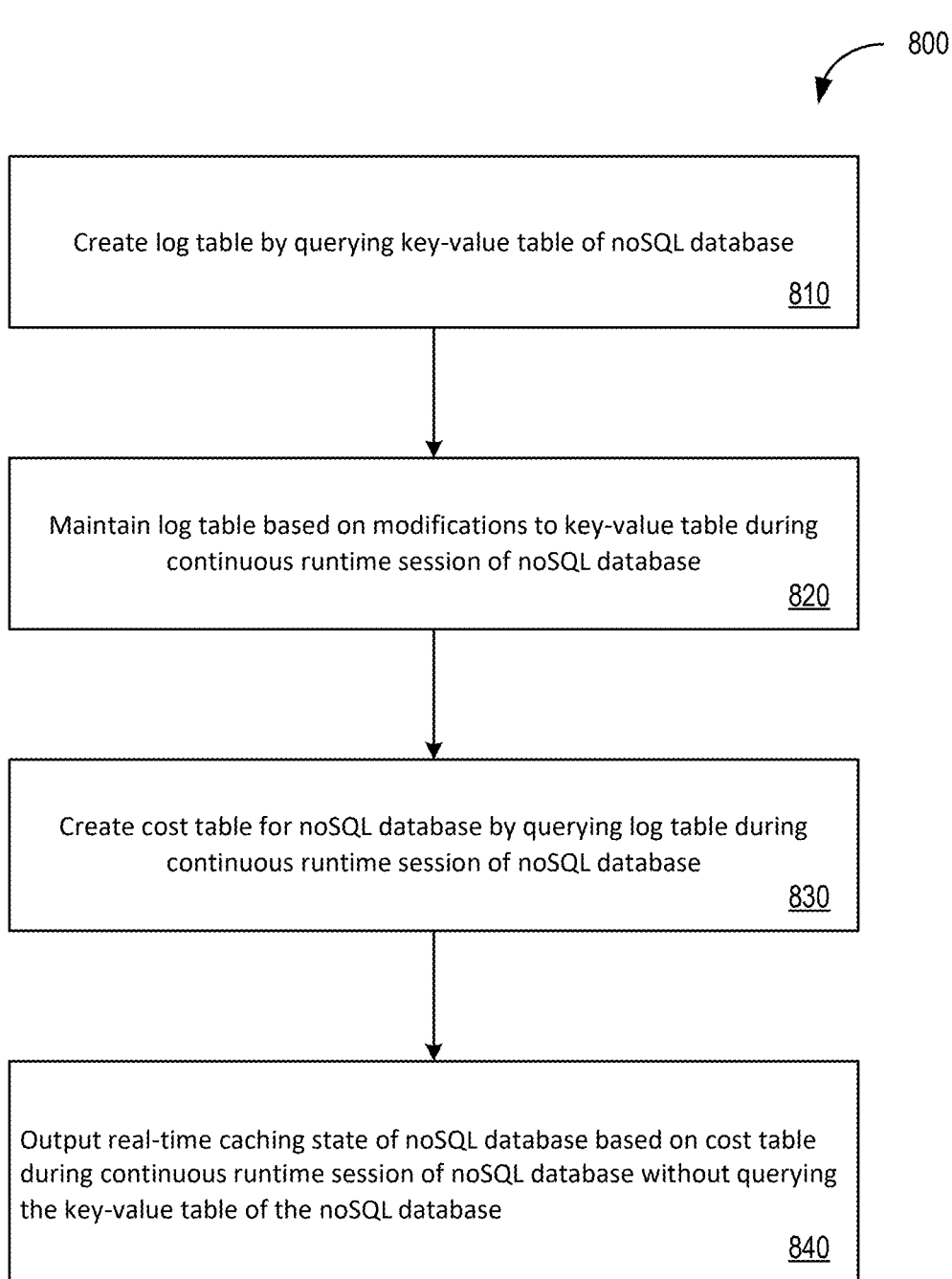

Create log table by querying key-value table of noSQL database

810

Maintain log table based on modifications to key-value table during continuous runtime session of noSQL database

820

Create cost table for noSQL database by querying log table during continuous runtime session of noSQL database

830

Output real-time caching state of noSQL database based on cost table during continuous runtime session of noSQL database without querying the key-value table of the noSQL database

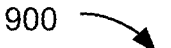
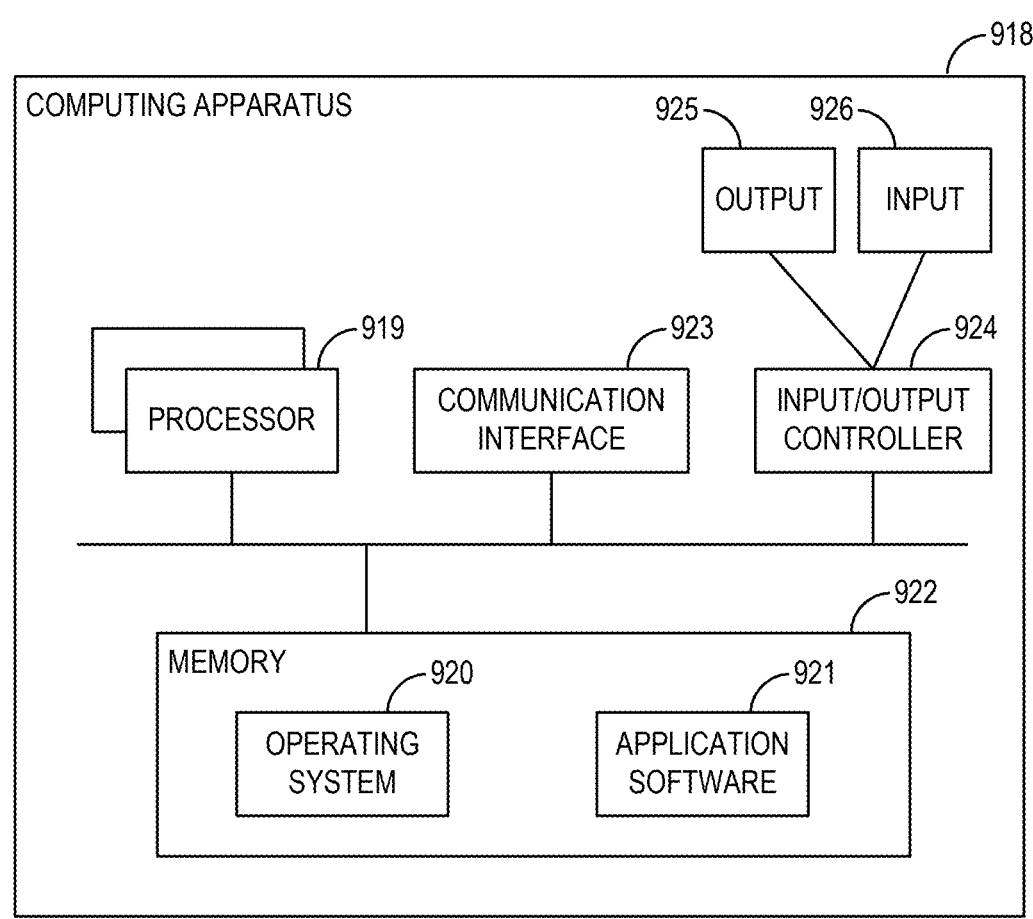
FIG. 9

UNDERSTANDING STORAGE UTILIZATION OF A CACHING SYSTEM THROUGH INCOMING TRAFFIC

BACKGROUND

With data being collected at ever increasing rates, traditional schema-based (SQL) databases (DBs) are increasingly unable to accommodate the data storage/access requirements of modern applications. In particular, these traditional SQL DBs are based on declarative language programming that necessitates specialty hardware and skilled administers to partition data and optimize runtime performance, which in-turn limits horizontal scalability. No-SQL (noSQL) DBs are increasingly viewed as a scalable alternative to traditional SQL DBs, as they provide greater flexibility in terms of how data types are structured and used, which in turn allows noSQL DBs to handle extremely large datasets with relatively inexpensive hardware. As such, noSQL DBs are being designed to support most large data applications, including for example E-commerce applications, social media platforms, Internet of Things (IoT), mobile applications, gaming, and big data analytics to name a few.

SUMMARY

Some examples provide a method for database optimization. The method includes creating a log table by querying a key-value table of a noSQL database prior to a continuous runtime session of the noSQL database. The method further includes maintaining the log table based on modifications to the key-value table of the noSQL database during the continuous runtime session of the noSQL database, and creating a cost table for the noSQL database during the continuous runtime session of the noSQL database by querying the log table without directly querying the key-value table of the noSQL database. The method also includes outputting a real-time caching state of the noSQL database based on the cost table during the continuous runtime session of the noSQL database without querying the key-value table of the noSQL database.

Other examples provide a computer storage medium having computer-executable instructions that, upon execution by a processor of a computer, cause the processor to perform a series of steps. The steps include creating a log table by querying a key-value table of a noSQL database prior to a continuous runtime session of the noSQL database. The steps further include maintaining the log table based on modifications to the key-value table of the noSQL database during the continuous runtime session of the noSQL database, and creating a cost table for the noSQL database during the continuous runtime session of the noSQL database by querying the log table without directly querying the key-value table of the noSQL database. The steps further include outputting a real-time caching state of the noSQL database based on the cost table during the continuous runtime session of the noSQL database without querying the key-value table of the noSQL database.

Other examples include a database management system comprising at least one processor and at least one memory comprising computer-readable instructions configured to cause the at least one processor to perform a series of steps. The steps include creating a log table by querying a key-value table of a noSQL database prior to a continuous runtime session of the noSQL database. The steps further include maintaining the log table based on modifications to the key-value table of the noSQL database during the continuous runtime session of the noSQL database, and creating a cost table for the noSQL database during the continuous runtime session of the noSQL database by querying the log table without directly querying the key-value table of the noSQL database. The steps further include outputting a real-time caching state of the noSQL database based on the cost table during the continuous runtime session of the noSQL database without querying the key-value table of the noSQL database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a diagram illustrating a cost table;

FIG. 4 is a diagram illustrating a log table;

FIGS. 5A-5E are diagrams illustrating how a log table is updated to reflect modifications to a key-value table;

FIGS. 6A-6C are diagrams illustrating how a log table is deduplicated in advance of creating a cost table;

FIG. 7 is a diagram illustrating a cost table created from the log table in FIG. 6C;

FIG. 8 is a flowchart illustrating a method for database optimization;

FIG. 9 illustrates a computing apparatus according to an embodiment as a functional block diagram.

Corresponding reference characters indicate corresponding parts throughout the drawings. Any of the figures may be combined into a single example or embodiment.

DETAILED DESCRIPTION

Figure 1:
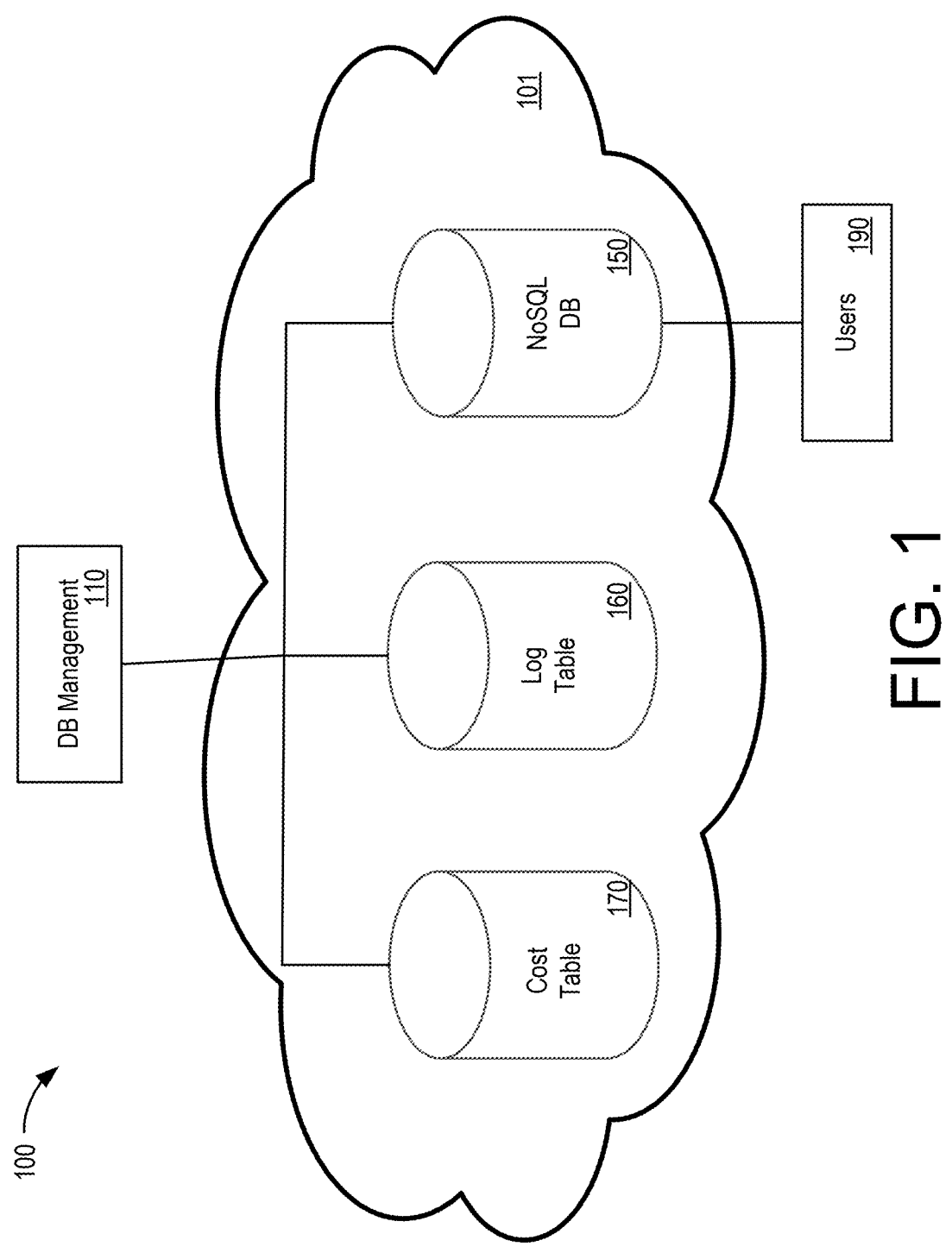
FIG. 1 is a diagram illustrating a system for providing a NoSQL database via a cloud computing architecture.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Managing noSQL DBs can be challenging because unstructured noSQL programming languages (e.g., JavaScript Object Notation (JSON), Extensible Markup Language (XML), binary schema, etc.) may support only a subset of the query operations available to structured SQL programming languages. For example, noSQL programming languages may not support joins, subqueries, secondary keys, aggregation, and other query operations supported by SQL languages. This can significantly increase the complexity of querying noSQL DBs to determine the caching state of the noSQL DB during DB optimization. More specifically, DB optimization generally includes, amongst other things, executing a sequence of bulk operations (e.g., bulk add, bulk replace, bulk remove) to restructure cached data by removing expensive properties with low utility. In order to identify candidate properties for removal, the DB manager may first need to understand the storage cost of each property cached in the noSQL DB. This can be relatively processing intensive, as it may require querying each row of the database to identify all values assigned to the property so that the individual costs associated with the assigned values can be aggregated to determine an overall cost for the property. Moreover, querying noSQL DBs generally impacts runtime performance and it may therefore be impractical to determine the caching state of noSQL DBs during runtime operation. On the other hand, it may generally be undesirable to take noSQL DBs offline for purposes of determining the caching state, as the related query operations may require several days of downtime for noSQL DBs storing large data-sets. Accordingly, improved DB management techniques for gauging the real-time caching state of noSQL DBs without impacting runtime performance are needed.

Aspects of this disclosure provide DB management techniques that gauge real-time caching states without querying the noSQL DB during runtime operation. More specifically, DB management techniques disclosed herein may maintain a log table based on modifications to a noSQL DB during a continuous runtime session. The log table is maintained by adding row entries to reflect modifications to the noSQL DB. The log table may then be deduplicated to remove stale entries and queried to generate a cost table reflecting a real-time caching state of the noSQL DB.

Modification of a noSQL DB generally includes adding, updating, or removing a key-value pair from a key-value table in the noSQL DB. It should be appreciated that a key-value pair may generally include a key (e.g., "Key1") and one or more property assignments (collectively referred to as the "value"). Each property assignment (e.g., {"Property1", "Value4"}) assigns a value (e.g., "Value4") to a property (e.g., "Property1") that is being cached in the noSQL DB. It should be appreciated that a given property may be assigned different values by different key-value pairs across the key-value table. Accordingly, each corresponding row entry in the log table may include the underling property assignment (e.g., "Property1", Value4") of the corresponding key-value pair as well as a key parameter identifying a key (e.g., "Key1") of the key-value pair. Each entry of the log table may further include a timestamp parameter identifying when the corresponding modification was made and an operation parameter indicating whether the key-value pair was added to, updated in, or deleted from the key-value table.

The information/parameters stored by the log table may collectively enable creation of a cost table without querying the noSQL DB. To create the cost table, the log table may first be de-duplicated to remove stale entries and then queried to determine the values assigned to each property. De-duplication of the log table may reflect that a key-value pair is added/updated/removed multiple times during the same continuous runtime session, and that the earlier operations have been rendered stale by the latest modification. More particularly, deduplicating the log table may include sorting row entries by key parameter and then pruning entries to reflect that earlier entries were rendered stale by a later entry. Sorting row entries by key parameter serves to group row entries having the same key parameter such that they are listed in order of their timestamp. The log table may thereafter be pruned by removing row entries of the same key parameter that are deleted by a later row entry. Deduping the log table may therefore ensure that the subsequently created cost table correctly reflects the real-time cache state of the noSQL DB. The utility and structure of the log table and cost tables provided by this disclosure are described in greater detail below.

FIG. 1 is a diagram illustrating a system 100 for providing a NoSQL DB 150 to users 190 via a cloud computing architecture 101. It should be appreciated that the cloud computing architecture 101 may include any platform, including hardware and software, that collectively provides storage, databases, software, analytics, and other services to the users 190 without the users 190 being proximately located to the hardware. The noSQL DB 150 may cache data in a manner that allows the users 190 to modify data in parallel without data corruption, e.g., without experiencing errors attributable to writing, reading, storage, transmission and processing of the underlying data. The noSQL DB 150 may be optimized by a DB manager 110 using various management resources in the system 100 including, but not limited to, a log table 160 and a cost table 170. It should be appreciated that management resources used by the DB manager 110 may be maintained within the cloud computing architecture 101 or outside the cloud computing architecture 101.

The DB management techniques provided herein may allow the DB manager 110 to determine a real-time caching state of the noSQL DB 150 during a continuous runtime session of the noSQL DB 150 without querying table(s) (e.g., a key-value table) of the noSQL DB 150. For example, the DB manager 110 may maintain/update the log table 160 to reflect modifications to the noSQL DB 150, and then use the log table 160 to create/update the cost table 170. The cost table may then be used to determine a real-time caching state of the noSQL DB 150 without querying the noSQL DB 150, and by extension without impacting runtime operation of the noSQL DB 150.

As used herein, the term "continuous runtime session" refers to a time window during which the noSQL DB remains in continuous runtime operation and by extension remains accessible to the users without being taken offload. In one example, a log table is maintained for at least a sliding window that has a duration based on the continuous runtime session, in which case the log table summarizes costs for an entire runtime session of the key-value table. Once an optimization plan for a noSQL DB has been finalized, the noSQL DB may be taken offline so that the optimization plan may be executed on the noSQL DB. It should be appreciated that the optimization plan may include a series of operations (e.g., bulk remove, bulk replace, etc.) aimed at improving runtime performance of the noSQL DB. The term "real-time caching state" refers to a data message that indicates all or a subset of information from the cost table. As an example, a noSQL DB that is used to host a social media platform may include a biographical property (e.g., age, demographic, etc.) for each user, and the real-time caching state of the noSQL DB may indicate a storage expense associated with the biographical property (e.g., amount of memory resources required to store the demographic property information). In such an example, the real-time caching state of the noSQL DB may be used to determine whether or not the expense of storing the biographical property is justified by the relative value of the underlying information, and if not, batch delete the property and corresponding property assignments from the noSQL DB. In this way, the ability to generate real-time caching states of a noSQL DB serves to optimize performance of the underlying system over time.

Figure 2:
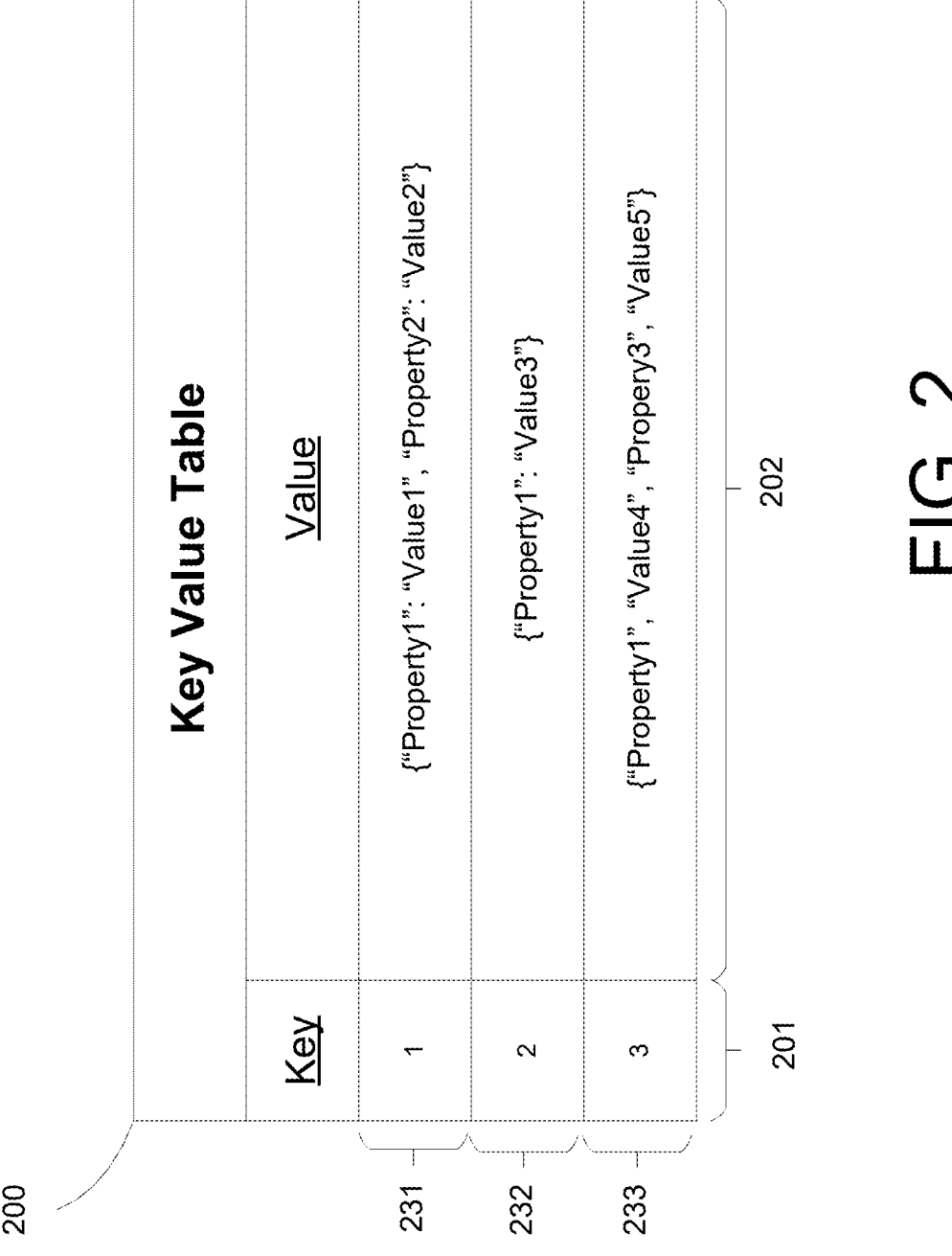
FIG. 2 is a diagram illustrating a key-value table.

FIG. 2 is a diagram illustrating a key-value table 200. As shown, the key-value table 200 includes key-value pairs 231, 232, 233. Each of the key-value pairs 231, 232, 233 includes a key (key column 201) and one or more property assignments in the value column 202. The key-value pair 231 includes key 1 and property assignments ({"Property1": "Value1", "Property2": "Value2"}), the key-value pair 232 includes key 2 and property assignments ({"Property1": "Value3"}), and the key-value pair 233 includes key 3 and property assignments ({"Property1", "Value4", "Propery3", "Value5"}).

FIG. 3 is a diagram illustrating a cost table 300 created by querying the key-value table 200. As shown, the cost table 300 includes row-entries 331, 332, 333 reflecting values assigned to the properties cached in the key-value table 200 as well as the aggregate size of the values assigned to each of the respective properties cached in the key-value table 200. More specifically, row-entry 331 reflects that querying the key-value table 200 based on Property1 yielded three values (i.e., "Value1", "Value3", "Value4") assigned to Property1 having an aggregate size of 18 characters. Row-entry 332 reflects that querying the key-value table 200 based on Property2 yielded one value (i.e., "Value2") having an aggregate size of 6 characters. Row-entry 333 reflects that querying the key-value table 200 based on Property3 yields one value (i.e., "Value5") having an aggregate size of 6 characters. It should be appreciated that the aggregate sizes reflected by the cost table 300 correlates to a memory storage cost or expense associated with caching the respective properties in the key-value table 200.

Aspects of this disclosure maintain a log table to reflect modifications to a key-value table for purposes of creating a cost table without querying the key-value table. FIG. 4 is a diagram illustrating a log table 400. As shown, the log table 400 includes row-entries 431, 432, 433 reflecting modifications to a key-value pair in a key-value table over a period of two days. The row-entries 431, 432, 433 include a timestamp parameter, a key parameter, an operation parameter and a value parameter. The row-entry 431 reflects that a key-value pair assigned key1 and including property assignment ({"Property1": "Value0"}) was added to the key-value table on Day 1. The row-entry 432 reflects that the aforementioned key-value pair was deleted from the key-value table on Day 2. The row-entry 433 reflects that a new version of the key-value pair (i.e., a key-value pair assigned key1 and including property assignment ({"Property1": "Value3"})) was added to the key-value table on Day 3. It should be appreciated that a given key-value pair may be deleted from a key-value table and subsequently re-added with a different property assignment.

Figure 5C:
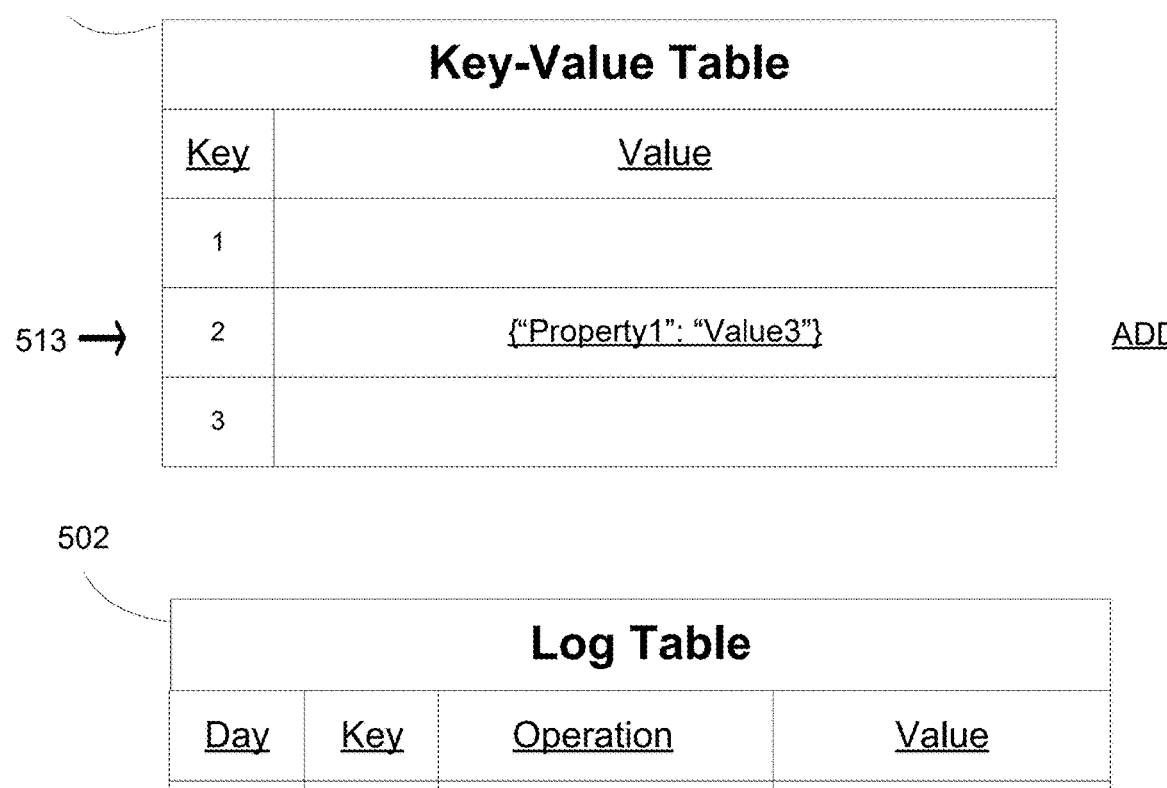

FIGS. 5A-5E are diagrams illustrating how a log table 502 is updated to reflect modifications to a key-value table 501. FIG. 5A shows that a row-entry 521 was added to the log table 502 to reflect a modification 511 to the key-value table 501. The row-entry 521 reflects that the modification 511 was made on Day 1 (timestamp parameter) to add a key-value pair assigned key1 (key parameter) that included property assignment ({"Property1": "Value0"}). FIG. 5B shows that a row-entry 522 was added to the log table 502 to reflect a modification 512 to the key-value table 501. The row-entry 522 reflects that the modification 512 was made on Day 1 (timestamp parameter) to remove (operation parameter) the key-value pair added previously by the modification 511.

FIG. 5C shows that a row-entry 523 was added to the log table 502 to reflect that a modification 513 was made to the key-value table 501. The row-entry 523 reflects that the modification 513 was made on Day 1 (timestamp parameter) to add (operation parameter) a key-value pair assigned key2 (key parameter) that included property assignment ({"Property1": "Value3"}).

FIG. 5D shows that a row-entry 524 was added to the log table 502 to reflect that a modification 514 was made to the key-value table 501. The row-entry 524 reflects that the modification 514 was made on Day 2 (timestamp parameter) to add (operation parameter) a key-value pair assigned key3 (key parameter) that included property assignment ({"Property1", "Value4", "Propery3", "Value5"}).

FIG. 5E shows that a row-entry 525 was added to the log table 502 to reflect that a modification 515 was made to the key-value table 501. The row-entry 525 reflects that the modification 515 was made on Day 3 (timestamp parameter) to add (operation parameter) a key-value pair assigned key1 (key parameter) that included property assignment ({"Property1": "Value1", "Property2": "Value2"}).

FIGS. 6A-6C are diagrams illustrating how a log table is deduplicated in advance of creating a cost table. FIG. 6A shows a log table 601 that includes row-entries 611, 612, 613, 614, 615. It should be appreciated that the log table 601 corresponds to the log table 502 in FIG. 5E. The log table 601 is sorted based on the key parameter to obtain the log table 602 in FIG. 6B. As shown, row-entry 615 has been repositioned in the log table 602 such that the row-entries having a key parameter set to key1 are grouped together and listed by order of timestamp. The log table 602 is then pruned to remove row-entries 611, 612 and obtain the log table 603 in FIG. 6C. The sorting and pruning operations serve to deduplicate the underlying log table by removing row-entries 611, 612 that were stale in view of row-entry 613.

FIG. 7 is a diagram illustrating a cost table 705 created by querying the log table 603 in FIG. 6C. As shown, the cost table 705 includes a row-entry 730 reflecting that querying the log table 603 based on Property1 yielded three values (i.e., "Value0", "Value3", "Value4") assigned to Property1 having an aggregate size of 18 characters. The cost table 705 further includes a row-entry 740 reflecting that querying the log table 603 based on Property2 yielded one value (i.e., "Value2") assigned to Property2 having an aggregate size of 6 characters. The cost table 705 further includes a row-entry 750 reflecting that querying the log table 603 based on Property3 yielded one value (i.e., "Value5") assigned to Property3 having an aggregate size of 6 characters.

FIG. 8 is a flowchart illustrating a method 800 for DB optimization, as might be performed by a processor. At step 810, the processor creates a log table by querying a key-value table of a noSQL DB. In some embodiments, step 810 is performed prior to a continuous runtime session of the noSQL DB. At step 810, the processor maintains the log table based on modifications to the key-value table during the continuous runtime session of the noSQL DB. In particular, the processor may monitor traffic being ingested into the key-value table to determine which key-value pairs are being added to, updated in, and removed from the key-value table. The processor may then add a corresponding row entry to the log table for each modification (e.g., each instance of a key-value pair being added to, updated in, and removed from the key-value table). At step 830, the processor creates a cost table for the noSQL DB by querying the log table. The cost table is created during the continuous runtime session of the noSQL DB without querying the key-value table of the noSQL DB. It should be appreciated that, in some embodiments, the processor may deduplicate the log table prior to generating the cost table as is described in FIGS. 6A-6C. The processor may create the cost table by querying rows of the log table based on properties in the key-value table. A given query result for a given property may yield all values assigned to that property in the log table, and may be used to create a row-entry in the cost table that reflects the property, all values assigned to the property, and an aggregate cost (size) of all the values assigned to the property. At step 840, the processor outputs a real-time caching state of the noSQL DB based on the cost table. The real-time caching state is output during the continuous runtime session of noSQL DB without querying the key-value table of the noSQL DB.

Exemplary Operating Environment

The present disclosure is operable with a computing apparatus according to an embodiment as a functional block diagram 900 in FIG. 9. In an example, components of a computing apparatus 918 are implemented as a part of an electronic device according to one or more embodiments described in this specification. The computing apparatus 918 is a computing device, such as, but not limited to, devices that are a part of system 100 of FIG. 1.

The computing apparatus 918 comprises one or more processors 919 which can be microprocessors, controllers, or any other suitable type of processors for processing computer executable instructions to control the operation of the electronic device. Alternatively, or in addition, the processor 919 is any technology capable of executing logic or instructions, such as a hardcoded machine. In some examples, platform software comprising an operating system 920 or any other suitable platform software is provided on the apparatus 918 to enable application software 921 to be executed on the device.

In some examples, computer executable instructions are provided using any computer-readable medium or media accessible by the computing apparatus 918. Computer-readable media include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 922) is shown within the computing apparatus 918, it will be appreciated by a person skilled in the art, that, in some examples, the storage is distributed or located remotely and accessed via a network or other communication link (e.g., using a communication interface 923).

Further, in some examples, the computing apparatus 918 comprises an input/output controller 924 configured to output information to one or more output devices 925, for example a display or a speaker, which are separate from or integral to the electronic device. Additionally, or alternatively, the input/output controller 924 is configured to receive and process an input from one or more input devices 926, for example, a keyboard, a microphone, or a touchpad. In one example, the output device 925 also acts as the input device. An example of such a device is a touch sensitive display. The input/output controller 924 in other examples outputs data to devices other than the output device, e.g., a locally connected printing device. In some examples, a user provides input to the input device(s) 926 and/or receives output from the output devices 925.

The functionality described herein can be performed, at least in part, by one or more hardware logic components. The computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a first search request, the first search request including one or more search terms; identifying one or more product categories as output from a machine learning classification model in response to inputting of the one or more search terms; identifying a first plurality of products that are assigned to the one or more product categories, each product of the first plurality of products including a plurality of product titles and a plurality of product short descriptions in a natural language; applying the plurality of product titles and the plurality of product short descriptions as input to a second machine learning model that is configured to generate a plurality of recommended searches, each recommended search of the plurality of recommended searches including at least one search term; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

At least a portion of the functionality of the various elements in FIG. 1 to FIG. 8 can be performed by other elements in FIG. 1 to FIG. 8, or an entity (e.g., processor, web service, server, application program, computing device, etc.) not shown in FIG. 1 to FIG. 8.

In some examples, the operations described herein can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for database optimization, the method comprising:

creating, by a processor, a log table by querying a key-value table of a noSQL database prior to a continuous runtime session of the noSQL database;

maintaining, by the processor, the log table based on modifications to the key-value table of the noSQL database during the continuous runtime session of the noSQL database, wherein at least some of the modifications to the key-value table of the noSQL database impact at least some properties cached in the key-value table of the noSQL database;

creating, by the processor, a cost table for the noSQL database during the continuous runtime session of the noSQL database by querying the log table without directly querying the key-value table of the noSQL database; and outputting, by the processor, a real-time caching state of the noSQL database based on the cost table during the continuous runtime session of the noSQL database without querying the key-value table of the noSQL database, wherein the real-time caching state of the noSQL database indicates memory storage costs associated with caching the properties in the key-value table of the noSQL database, and wherein the real-time caching state is used to select at least one of the properties cached in the key-value table of the noSQL database for batch deletion when optimizing the noSQL database.

2. The method of claim 1, wherein row entries of the log table reflect key-value pairs added to, updated in, and removed from the key-value table of the noSQL database during the continuous runtime session of the noSQL database.

3. The method of claim 2, wherein each of the row entries of the log table includes a key parameter identifying a corresponding key-value pair added to, updated in, and removed from the key-value table of the noSQL database, a timestamp parameter identifying when the corresponding key-value pair was added to, updated in, and removed from the key-value table of the noSQL database, and an operation parameter specifying whether the corresponding key-value pair was added to, updated in, and removed from key-value table of the noSQL database.

4. The method of claim 1, wherein the log table is maintained for a predetermined sliding window corresponding to a duration of the continuous runtime session of the noSQL database.

5. The method of claim 1, further comprising:

selecting, by the processor during the continuous runtime session of the noSQL database, a subset of properties in the key-value table to prune from the key-value table based on the real-time caching state; and pruning, by the processor, the subset of properties from the key-value table of the noSQL database after completion of the continuous runtime session of the noSQL database.

6. The method of claim 1, wherein updating the log table comprises:

adding a first row entry to the log table reflecting addition of a key-value pair of the key-value table during the continuous runtime session of the noSQL database.

7. The method of claim 6, wherein updating the log table further comprises:

adding a second row entry to the log table reflecting deletion of the key-value pair of the key-value table during the continuous runtime session of the noSQL database.

8. The method of claim 7, wherein creating the cost table comprises:

sorting the log table based on a key column of the log table, the key column of the log table cross-referencing row entries of the log table with key-value pairs of the key-value table; and removing both the first row entry and the second row entry from the log table to reflect that the key-value pair was added to and subsequently deleted from the key-value table during the continuous runtime session of the noSQL database.

9. The method of claim 1, wherein the real-time caching state of the noSQL database is determined by querying the cost table without querying the key-value table of the noSQL database.

10. The method of claim 9, wherein querying the key-value table of the noSQL database during the continuous runtime session of the noSQL database impacts runtime operation of the noSQL database.

11. The method of claim 9, wherein querying the cost table during the continuous runtime session of the noSQL database does not impact runtime operation of the noSQL database.

12. The method of claim 9, wherein querying the log table during the continuous runtime session of the noSQL database does not impact runtime operation of the noSQL database.

13. A computer storage medium having computer-executable instructions that, upon execution by a processor of a computer, cause the processor to at least:

create a log table by querying a key-value table of a noSQL database prior to a continuous runtime session of the noSQL database;

maintain the log table based on modifications to the key-value table of the noSQL database during the continuous runtime session of the noSQL database, wherein at least some of the modifications to the key-value table of the noSQL database impact at least some properties cached in the key-value table of the noSQL database;

create a cost table for the noSQL database during the continuous runtime session of the noSQL database by querying the log table without directly querying the key-value table of the noSQL database; and output a real-time caching state of the noSQL database based on the cost table during the continuous runtime session of the noSQL database without querying the key-value table of the noSQL database, wherein the real-time caching state of the noSQL database indicates memory storage costs associated with caching the properties in the key-value table of the noSQL database, and wherein the real-time caching state is used to select at least one of the properties cached in the key-value table of the noSQL database for batch deletion when optimizing the noSQL database.

14. The computer storage medium of claim 13, wherein row entries of the log table reflect key-value pairs added to, updated in, and removed from the key-value table of the noSQL database during the continuous runtime session of the noSQL database.

15. The computer storage medium of claim 14, wherein each of the row entries of the log table includes a key parameter identifying a corresponding key-value pair added to, updated in, and removed from the key-value table of the noSQL database, a timestamp parameter identifying when the corresponding key-value pair was added to, updated in, and removed from the key-value table of the noSQL database, and an operation parameter specifying whether the corresponding key-value pair was added to, updated in, and removed from the key-value table of the noSQL database.

16. The computer storage medium of claim 13, wherein the log table is maintained for a predetermined sliding window corresponding to a duration of the continuous runtime session of the noSQL database.

17. The computer storage medium of claim 13, the computer-executable instructions further cause the processor to:

select, processor during the continuous runtime session of the noSQL database, a subset of properties in the key-value table to prune from the key-value table based on the real-time caching state; and prune the subset of properties from the key-value table of the noSQL database after completion of the continuous runtime session of the noSQL database.

18. The computer storage medium of claim 13, wherein the computer-executable instructions causing the processor to update the log table further cause the processor to:

add a first row entry to the log table reflecting addition of a key-value pair to the key-value table during the continuous runtime session of the noSQL database; and add a second row entry to the log table reflecting deletion of the key-value pair to the key-value table during the continuous runtime session of the noSQL database.

19. The computer storage medium of claim 18, wherein the computer-executable instructions causing the processor to update the log table further cause the processor to:

sort the log table based on a key column of the log table, the key column of the log table cross-referencing row entries of the log table with key-value pairs of the key-value table; and remove both the first row entry and the second row entry from the log table to reflect that the key-value pair was added to and subsequently deleted from the key-value table during the continuous runtime session of the noSQL database.

20. A database management system comprising:

at least one processor; and at least one memory comprising computer-readable instructions, the at least one processor, the at least one memory and the computer-readable instructions configured to cause the at least one processor to:

create a log table by querying a key-value table of a noSQL database prior to a continuous runtime session of the noSQL database;

maintain the log table based on modifications to the key-value table of the noSQL database during the continuous runtime session of the noSQL database, wherein at least some of the modifications to the key-value table of the noSQL database impact at least some properties cached in the key-value table of the noSQL database;

create a cost table for the noSQL database during the continuous runtime session of the noSQL database by querying the log table without directly querying the key-value table of the noSQL database; and output a real-time caching state of the noSQL database based on the cost table during the continuous runtime session of the noSQL database without querying the key-value table of the noSQL database, wherein the real-time caching state of the noSQL database indicates memory storage costs associated with caching the properties in the key-value table of the noSQL database, and wherein the real-time caching state is used to select at least one of the properties cached in the key-value table of the noSQL database for batch deletion when optimizing the noSQL database.

* * * * *